A. F. BATCHELDER.
SELF PROPELLED MOTOR CAR.
APPLICATION FILED NOV. 11, 1918.

1,375,995.

Patented Apr. 26, 1921.
2 SHEETS—SHEET 1.

Inventor:
Asa F. Batchelder,
by Albert G. Davis
His Attorney.

A. F. BATCHELDER.
SELF PROPELLED MOTOR CAR.
APPLICATION FILED NOV. 11, 1918.

1,375,995. Patented Apr. 26, 1921.
2 SHEETS—SHEET 2.

Inventor:
Asa F. Batchelder,
by
His Attorney.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

SELF-PROPELLED MOTOR-CAR.

1,375,995.  Specification of Letters Patent.  Patented Apr. 26, 1921.

Application filed November 11, 1918. Serial No. 262,019.

*To all whom it may concern:*

Be it known that I, ASA F. BATCHELDER, a citizen of the United States, residing at Schenectady, in the county of Schenectady, State of New York, have invented certain new and useful Improvements in Self-Propelled Motor-Cars, of which the following is a specification.

The present invention relates to motor cars and particularly to such cars in which an internal combustion engine or the like is used for developing the driving power.

In such cars the engine is placed within the car and is connected to the driving axles either mechanically or by driving a generator which supplies power to motors connected to the car axles. Internal combustion engines always vibrate to a greater or less extent and, particularly for certain uses, it is desirable that such vibrations should not be transmitted to the car body for obvious reasons.

The object of my invention is to provide an improved supporting arrangement for the engine of a motor car whereby the engine is so supported thereon that vibrations will not be transmitted from it to the car body.

For a consideration of what I believe to be novel and my invention, attention is directed to the accompanying description and the claims appended thereto.

Figure 1:
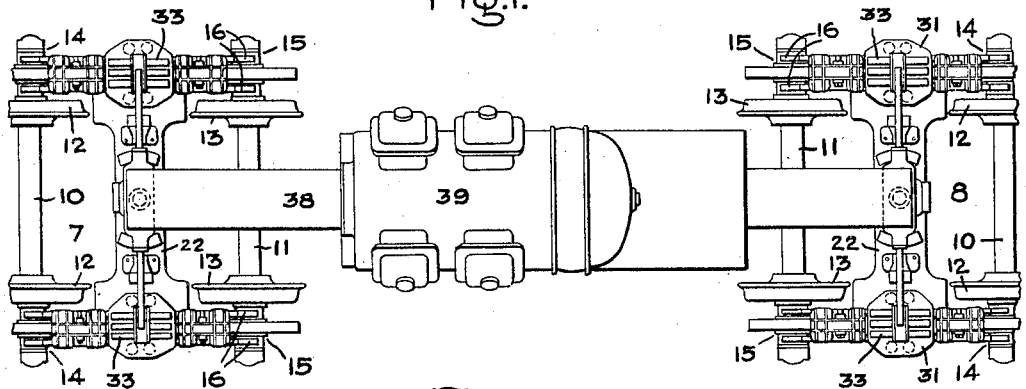
Figure 2:
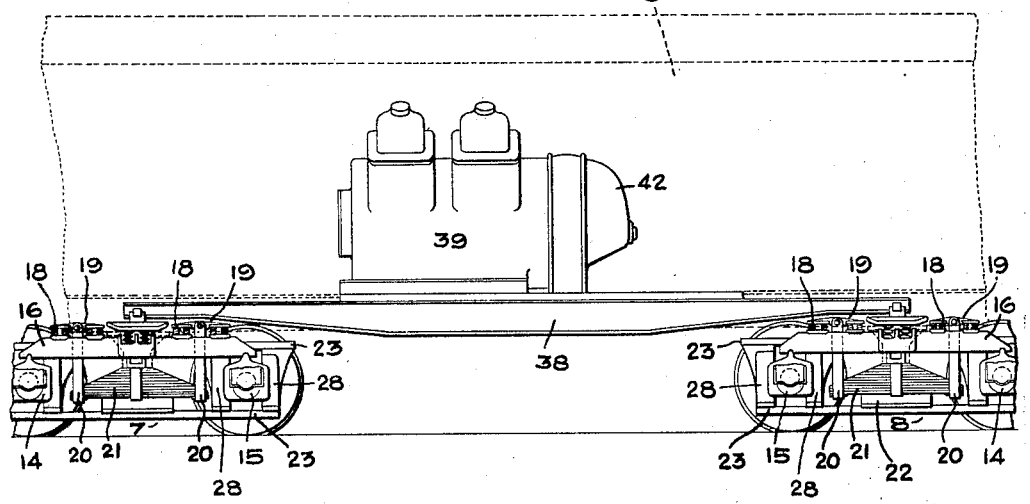
Figure 3:
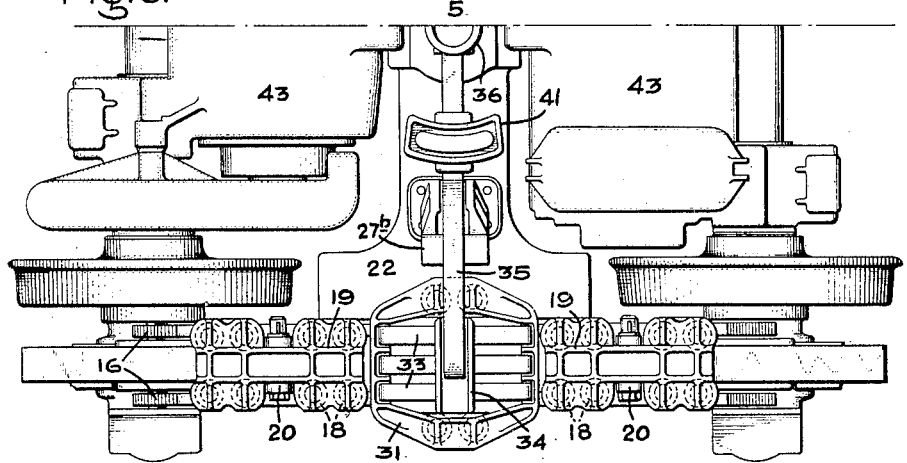
Figure 4:
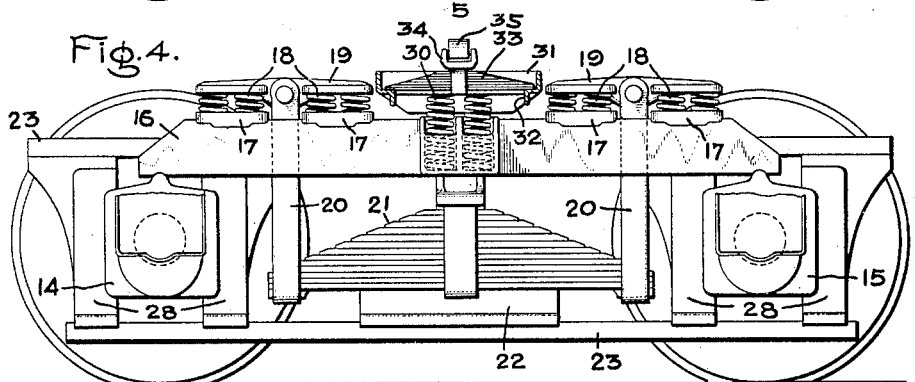
Figure 5:
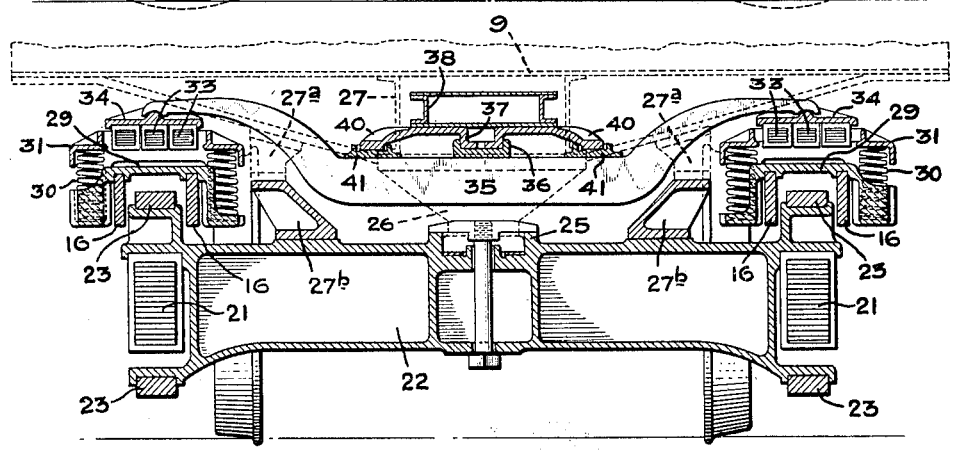

In the drawing, Figure 1 is a top plan view of a diagrammatic nature of an engine-supporting means embodying my invention; Fig. 2 is a side elevation thereof; Fig. 3 is a top plan view on a larger scale than Fig. 1 of one side of a truck showing one pair of wheels; Fig. 4 is a side elevation of a truck as shown in Fig. 3, and Fig. 5 is a section taken on line 5—5 Fig. 3.

Referring to the drawings, Figs. 1 and 2, 7 and 8, indicate two trucks, one located at each end of a motor car, the body 9 of which is indicated in dotted lines in Fig. 2. Trucks 7 and 8 are alike in structure and the following specific description and the illustration in Figs. 3, 4 and 5 may be taken as applying to either of them. Each truck comprises two axles 10 and 11 upon which are mounted wheels 12 and 13 in the usual manner. The ends of axles 10 and 11 are located in journal boxes 14 and 15 respectively. Extending from journal box 14 to journal box 15 on each side of the truck is a pair of spaced side bars 16 and located at the ends of each pair of side bars are cross pieces 17 upon which are supported springs 18. Resting on springs 18 are plates 19 from which depend hangers 20 and supported by the lower end of hangers 20 on each side of the truck are leaf springs 21 which extend parallel to the side of the car, one on each side. Supported by leaf springs 21 is a truck frame comprising a truck bolster or central bar 22 which extends cross-wise of the truck with its ends resting directly on the leaf springs 21 as best seen from Fig. 5, and two side frames 23 which extend parallel to the truck, one on each side, and are fixed at their central portions to the ends of bolster or cross bar 22. The ends of side frames 23 have vertical guides 28 which embrace the journal boxes 14 to permit vertical movement of the truck frame. The truck frame is thus resiliently supported on the journal boxes by springs 21 and springs 18 and can move vertically.

At the middle of the bolster or central cross bar 22 of each truck frame is a truck center plate 25 in which is pivoted the body center plate 26. The two body center plates 26 support the two ends of a longitudinally extending beam 27 upon which the car body 9 directly rests. It will thus be seen that the car body is resiliently supported on the journal boxes 14 and 15 by springs 18 and 21, and that the two trucks can turn in a horizontal plane relative to the car body. The car body is prevented from tilting by means of the body side bearings 27$^a$ which engage truck side bearings 27$^b$.

Now according to my invention I also resiliently support the internal combustion engine which drives the car on the journal boxes of the two trucks by a suitable supporting member or beam, which extends from one truck to the other and is quite independent of the car body and the beam which supports it. At the central portion of each pair of side bars 16 is fixed a saddle member 29 which supports springs 30 upon which rests a rectangular bracket 31. Each bracket 31 has ledges 32 (Fig. 4) upon which rest the ends of a set of leaf springs 33, and fixed to the central portion of each set of leaf springs 33 is a supporting plate 34. Extending crosswise of each truck is an auxiliary bolster or bar 35 the two ends of which rest on the plates 34 of such truck. The auxiliary bolster or cross bars 35 are in vertical alinement with the bolster or cross bars 22 and are provided at their central portions with center plates or sockets 36 in which are located pivot members 37 upon which rest the two ends of a beam 38. Beam 38 extends from one truck to the other and midway between its ends is mounted the internal combustion engine 39. In order to prevent beam 38 and engine 39 from rocking in a transverse plane the pivot members 36 are provided with downwardly curved arms 40 the ends of which rest in arcuate sockets 41, the centers of curvature of such sockets being the centers of curvature of sockets 36. Center plates 36 are vertically alined with center plates 25 so that the trucks can turn in a horizontal plane relation to both the car body and the engine support. When such turning occurs the ends of arms 40 move in arcuate sockets 41.

In the present instance the engine 39 is shown as being directly connected to a generator 42 from which power is applied to motors 43 (Fig. 3) which are geared directly to the axles.

With the above described arrangement it will be seen that the car body and the engine are resiliently mounted directly on the journal boxes independently of each other and that the engine is mounted centrally of a long beam midway between the two trucks. For any vibrations of the engine to reach the car body therefore, they must be transmitted through the long beam 38, leaf springs 33, and coiled springs 30 to the journal boxes and then through coiled springs 18, and leaf springs 21 to the car body. As will be readily apparent, this means that it will be practically impossible for vibrations of the engine to measurably affect the car body.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. In combination, a pair of trucks, a car body supported thereby, an engine, and means for supporting the engine on said two trucks independently of the car body.

2. In combination, a pair of trucks, a car body supported thereby, a beam having its two ends supported on the truck independently of the car body, and an engine supported on said beam.

3. In combination, a pair of trucks, a car body resiliently supported thereby, an engine, and means resiliently supporting the engine on said two trucks independently of the car body.

4. In combination, a pair of trucks, two beams having their ends resiliently supported on said trucks, a car body mounted on one of said beams, and an engine mounted on the other of said beams.

5. In combination, a pair of trucks, two beams having their ends resiliently and pivotally supported on said trucks with the pivots at each truck in vertical alinement, a car body mounted on one of said beams, and an engine mounted on the other of said beams.

6. In combination, a pair of trucks each having an axle with wheels thereon, journal boxes for said axles, two separate means which extend from one truck to the other and are supported on said journal boxes, a car body mounted on one of said means, and an engine mounted on the other of said means.

7. In combination, spaced axles having wheels thereon, journal boxes for said axles, two beams having their ends resiliently supported on said journal boxes, a car body mounted on one of said beams, and an engine mounted on the other of said beams.

8. In combination, two pairs of spaced axles having wheels thereon, journal boxes for said axles, side bars resting on the journal boxes of each pair of axles, two vertically alined cross bars associated with each pair of axles and having their ends resiliently supported on said side bars, a car body having its ends supported on one cross bar of each pair of axles, and an engine supported by the other cross bar of each pair of axles.

9. In combination, two pairs of spaced axles having wheels thereon, journal boxes for said axles, side bars resting on the journal boxes of each pair of axles, two vertically alined cross bars associated with each pair of axles and having their ends resiliently supported on said side bars, a beam having its two ends supported by a cross bar of each pair of axles, a second beam having its two ends supported by the other cross bar of each pair of axles, a car body mounted on one of said beams, and an engine mounted on the other of said beams.

10. In combination, two pairs of spaced axles having wheels thereon, journal boxes for said axles, side bars resting on the journal boxes of each pair of axles, two vertically alined cross bars associated with each pair of axles and having their ends resiliently supported on said side bars, two beams having their ends pivotally supported in vertical alinement on said cross bars, a car body mounted on one of said beams, and an engine mounted on the other of said beams.

In witness whereof, I have hereunto set my hand this 9th day of November, 1918.

ASA F. BATCHELDER.